United States Patent [19]

Krevald et al.

[11] 4,069,574
[45] Jan. 24, 1978

[54] PROCESS FOR THE MANUFACTURE OF A COSMETIC OR PHARMACEUTICAL STICK

[75] Inventors: Helga Krevald, Tarrytown; Donald Patrick Johnson, Flushing, both of N.Y.; Keith Woodruff, Mountainside, N.J.

[73] Assignee: American Cyanamid Company, Stamford, Conn.

[21] Appl. No.: 732,633

[22] Filed: Oct. 15, 1976

[51] Int. Cl.² .......................... B29C 1/00; B29D 31/00
[52] U.S. Cl. ........................................ 29/434; 264/267
[58] Field of Search .......................... 29/434, DIG. 44; 264/267, 90, DIG. 78; 53/112 R, 122, 127

[56] References Cited

U.S. PATENT DOCUMENTS

| 2,753,991 | 7/1956 | Sherman | 264/267 |
| 2,855,632 | 10/1958 | Croce et al. | 425/DIG. 32 |
| 2,879,548 | 3/1959 | Croce et al. | 53/122 |
| 3,315,344 | 4/1967 | Niclas | 425/DIG. 32 |
| 3,898,726 | 8/1975 | Godart et al. | 29/DIG. 44 |

FOREIGN PATENT DOCUMENTS 757,549  4/1967  Canada .............................. 264/267

Primary Examiner—Lowell A. Larson
Assistant Examiner—Daniel C. Crane
Attorney, Agent, or Firm—Charles J. Fickey

[57] ABSTRACT

A process for manufacturing a wax-like cosmetic stick product having an improved contour on its upper surface, by filling at the open bottom with the stick material in a molten state, the case having a cap which provides the contour, allowing the stick to solidify, and placing a push-up device in the bottom of the case.

6 Claims, 1 Drawing Figure

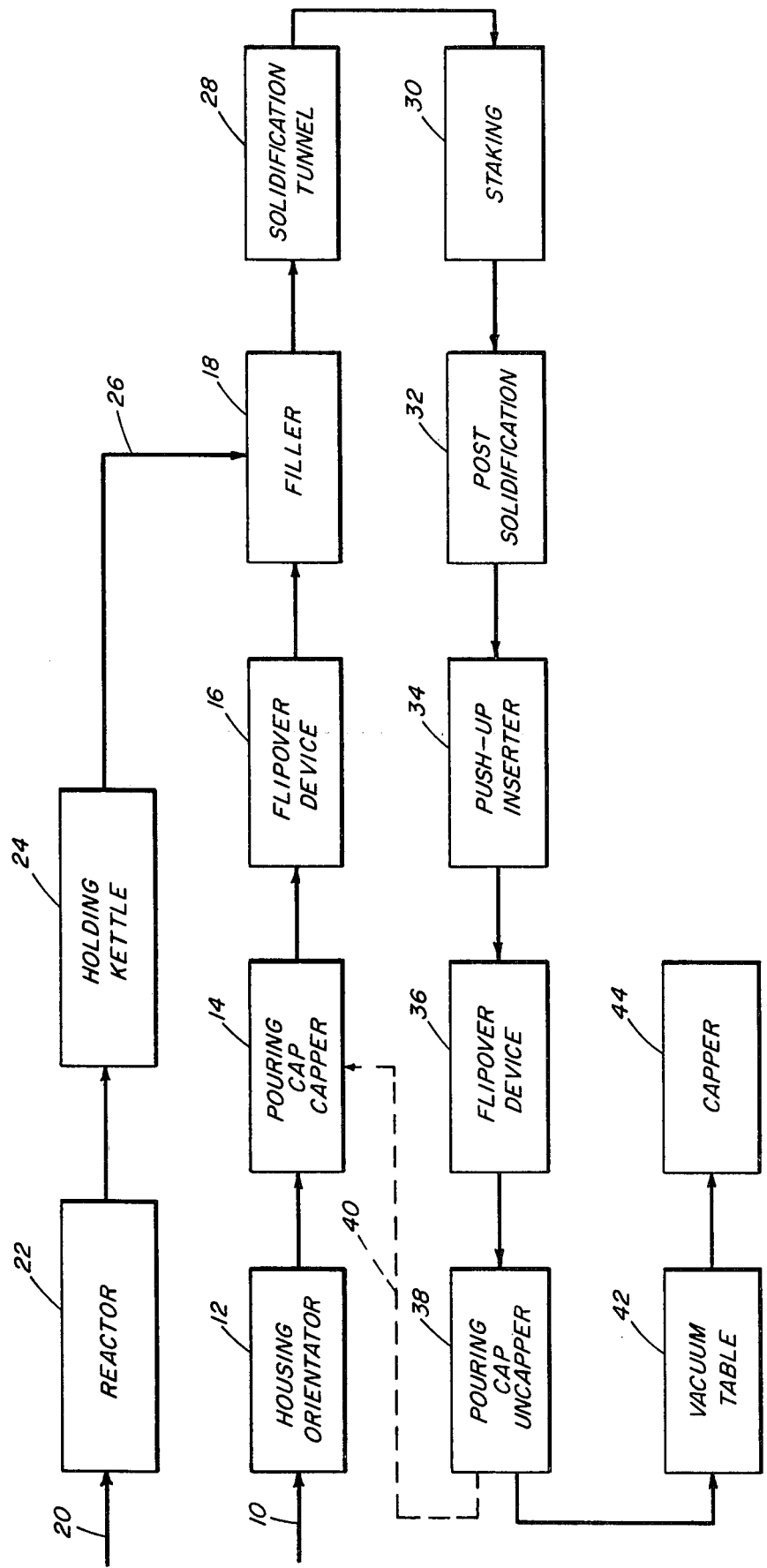

PROCESS FOR THE MANUFACTURE OF A COSMETIC OR PHARMACEUTICAL STICK

This invention relates to a method for the manufacture of a solid, low melting, wax-like cosmetic or pharmaceutical stick. More particularly, it relates to a novel method for the manufacture of a cosmetic stick, especially an antiperspirant stick, having a custom molded top surface.

Most cosmetic sticks, including deodorant and antiperspirant compositions, comprise a solid, waxy, low melting formulation, containing an active ingredient, where applicable, encased in a suitable container provided with a means for pushing the stick upwards through the container to expose more surface as the stick is consumed. Heretofore, as far as we are aware, these sticks, particularly deodorant and antiperspirant sticks, have been fabricated by pouring the molten composition into the top of a suitable container equipped with a suitable push-up device inserted into the bottom thereof. In so doing, a pouring cup, open at the top, or pouring device, is first attached to the top of the container in a removable manner. Ordinarily, excess of the formulation remains in the pouring cup, so that when the composition hardens, and the pouring cup is removed from the container, the excess is cut away from the stick by means of a knife. The knife usually consists of a wire fixed into the pouring cup. When the pouring cup is removed, usually with a twisting action, the wire cuts off the excess, leaving the stick with a flat surface.

The method described results in a product having a number of disadvantages. In cutting of the excess at the top of the stick, a top surface is formed on the stick which is substantially perpendicular to the longitudinal axis of the stick, thereby forming a squared edge. When this edge is applied to a surface, it results in crumbling, with resultant loss of material until a rounded edge finally forms. Moreover, the cutting of the top edge results in a certain amount of waste product. In addition, during cooling and solidification of the stick material as poured in the container, the top surface contracts leaving air voids creating an unfavorable effect esthetically in the mind of the user.

In the process of the present invention, several novel procedures are used to provide a cosmetic stick, particularly an antiperspirant stick, with an esthetically pleasing, custom molded upper surface.

The process steps involved in the novel procedure of the invention are depicted in the FIGURE which is a flow sheet of the various operations of the process.

With reference to said flow sheet, a reactor 22 is charged via line 20 with the ingredients to prepare the cosmetic stick formulation, which is then held until needed in a heated holding kettle 24.

In a continuous manner a housing orientator 12 aligns the container bodies or housings, which are generally open at both top and bottom, in an upright position on a conveyor belt 10. The container housing then moves to a pouring cap affixing or capping device 14 which affixes onto the top of the housing a pouring cap, which closes the top end of the container housing. The interior surface of pouring cap is shaped to form the custom upper surface of the stick. This may be done by inserting a mold in the pouring cap. When the pouring cap has been affixed, a flipover device 16 inverts the container to that it may be filled from the open bottom via a filling device 18, via line 26, whereby a premeasured quantity of the formulation is added to the container. The filled container then traverses a series of refrigerated solidification zones or tunnels 28 whereby it solidified to form the stick product. After cooling, air bubbles or voids, which form near the upper surface (in this case the bottom of the container) are dissipated by inserting into the exposed surface of the stick, in the area near the voids, an electrically heated prong, called a staking device 30. The staking device causes the composition around the voids to melt and flow into and fill the voids. Following staking, the container then traverses a second series of refrigerated solidification zones or tunnels 32, wherein the composition melted during staking is allowed to re-solidify. A single piece push-up device is then inserted by a push-up inserter 34 into the bottom of the container body by means of a reducing collar affixed thereto. Following insertion of the push-up device, the container is inverted by a flipover device 36 and then travels to an uncapping device 38 which removes the pouring cap from the top of the container. When the pouring cap is removed the upper molded surface of the stick is too high above the container top to permit capping of the container. Moreover, the stick in the container is not yet firmly in contact with the push-up device. It is therefore necessary to move the stick downward into the housing until it is in contact with the push-up device. This may be accomplished by passing the uncapped container to a vacuum table 42, where a vacuum applied to the bottom, acting through one or more small holes through the base of the push-up device, pulls the stick down into the container into contract with the push-up device and also lowering the upper surface of the stick to or below the upper edge of the container. Finally, the container is capped by the capper device 44.

The shape of the top surface of the stick will depend on the design of the mold inserted into the pouring cap. Such designs may include lettering etched into the mold surface to depict the product name or company logo, and the like. Moreover, the mold may provide a tapered edge to the top edge of the stick whereby crumbling of the stick is prevented during use.

The method of the invention is particularly useful for the preparation of deodorant and antiperspirant sticks, but may be used effectively for other cosmetic or pharmaceutical formulations in stick form.

We claim:

1. A process for the manufacture of a solid, wax-like cosmetic or pharmaceutical stick product, which comprises the steps of attaching a pouring cap closure to the upper portion of a suitable container for said stick, said container being open at the bottom; inverting said container body and filling from the bottom thereof with a premeasured quantity of said cosmetic or pharmaceutical composition in a molten state; cooling said composition to form within the body of said container a solid, wax-like stick, inserting into the bottom portion of said container body, a push-up device, re-inverting the container and removing said pouring cap; moving said stick into contact with said push-up device and affixing a cap to said container.

2. The process according to claim 1 wherein said container is a cylindrical body threaded on the upper portion to receive a cap and having a flange incorporated in the bottom as a seat for said push-up device.

3. A process as in claim 1 wherein a heated staking device is inserted into the bottom of said solidified stick to melt the stick in the vicinity of any voids and cause filling thereof, and said stick is again cooled, prior to inserting said push-up device.

4. A process as in claim 1 wherein said stick is pulled into contact with said push-up device by applying a vacuum through at least one hole through the base of said push-up device.

5. A process for the manufacture of a solid, wax-like cosmetic or pharmaceutical stick, having a custom molded upper surface, which comprises the steps of attaching a pouring cap closure to the upper portion of a suitable container for said stick, said container being open at the bottom, said pouring cap having therein a mold, said mold forming the shape and design of the upper surface of the stick; inverting said container body and filling from the bottom thereof with a premeasured quantity of the molten cosmetic or pharmaceutical composition; cooling said composition to form within the body of said container a solid, wax-like stick having a custom molded upper surface; inserting into the bottom portion of said container body a push-up device, by means of a reducing collar attached removably to the bottom of said body, re-inverting the container and removing said pouring cap; thereafter moving said stick into contact with said push-up device and affixing a cap to said container.

6. A process for the manufacture of a solid, wax-like cosmetic or pharmaceutical stick, having a custom molded upper surface, which comprises the steps of (1) attaching a pouring cap closure to the upper portion of a suitable container for said stick, said container being open at the bottom, said pouring cap having inserted therein a removable mold, said mold forming the shape and design of the upper surface of the stick; (2) inverting said container body and filling from the bottom thereof with a premeasured quantity of the molten cosmetic or pharmaceutical composition; (3) cooling said composition to form within the body of said container a solid, wax-like stick having a custom molded upper surface; (4) inserting into the bottom of said stick an electrically heated prong, whereby voids and air bubbles near the surface are dissipated by melting the composition and allowing the molten composition to flow into and fill said voids; (5) allowing the molten composition to re-solidify; (6) inserting into the bottom portion of said container a single piece plastic push-up device, by means of a reducing collar attached removably to said body, said push-up device having a plurality of small holes drilled therethru; (7) re-inverting the container and removing said pouring cap; (8) applying a vacuum to the bottom of said container, whereby said stick is pulled into contact with said push-up device by means of the holes drilled therethru; and (9) affixing a cap to said container.

* * * * *